April 11, 1961     G. W. KILLIAN     2,978,830

FISH LURE HOLDER

Filed Feb. 17, 1959

Gaddis W. Killian

INVENTOR.

United States Patent Office 2,978,830
Patented Apr. 11, 1961

2,978,830

FISH LURE HOLDER

Gaddis W. Killian, Rte. 6, Fort Payne, Ala.

Filed Feb. 17, 1959, Ser. No. 793,799

1 Claim. (Cl. 43—57.5)

This invention relates to a fisherman's armband for flies and small lures.

An object of the invention is to provide a device for conveniently holding fish lures and flies, hooks and any other small article which the user of the armband wishes.

Although armbands have been constructed in the past, and these armbands were used to hold various articles, the present armband possesses some distinguishing features making the present armband considerably more convenient and providing for twice the longevity of previous armbands. This armband is made of a foam rubber or other flexible easily penetrated substance, for example foam plastic or an equivalent substance, and there are one or more elastic straps which extend through the center of the flexible substance lengthwise thereof. Accordingly, the outer surface is used to receive fishhooks and/or the like and when this surface becomes worn, the armband is reversed thereby presenting a new surface for receiving fishhooks and/or the like.

By having the elastic strap or straps connected in this way to the rubber pad, the armband is reversible, with each side being usable identically.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
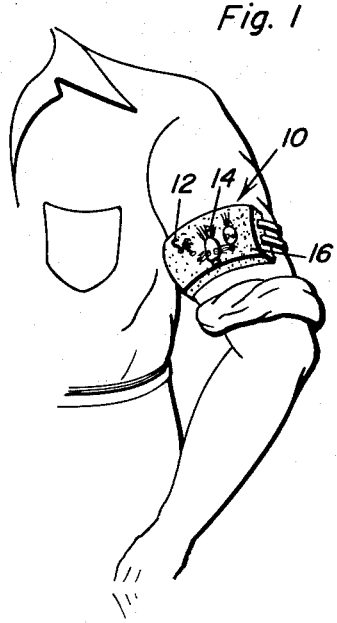
Figure 1 is a perspective view of an armband being used.
Figure 2:
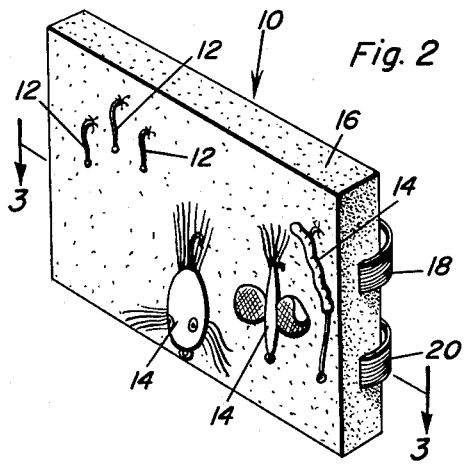
Figure 2 is a perspective view of the armband.

In the accompanying drawings there is an armband 10 for retaining fishhooks 12, fishing flies 14 and any other fisherman's device, appliance or the like which the user of the band desires to attach to the band. The armband is made of a pad 16 together with one or more straps 18 and 20. The pad 16 is preferably made of sponge rubber or an elastomeric plastic possessing qualities similar to sponge rubber. For instance, expanded polystyrene or foam plastics or expanded glass substance may be used. Any sponge like material ordinarily makes an excellent pad 16.

Figure 3:
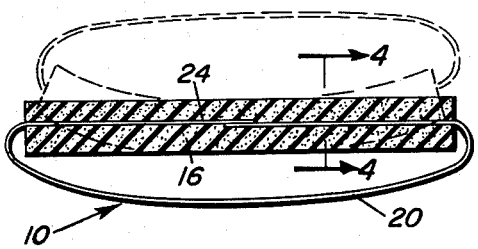
Figure 3 is a longitudinal sectional view taken on the line 3—3 of Figure 2 with the fishhooks and flies omitted, this view also showing a deflected position in dotted lines at which the band is used when one surface of the pad becomes worn.
Figure 4:
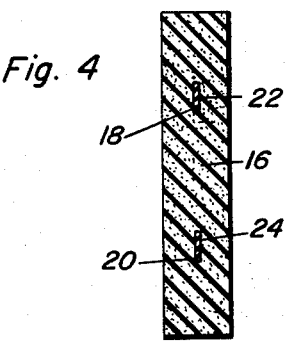
Figure 4 is a transverse sectional view taken on the line 4—4 of Figure 3.

Straps 18 and 20 are made of elastic, for instance rubber or rubber interwoven with or bound by cotton threads. Each strap is endless, forming a closed loop. However, the straps may be fastened to the side edges of the pad with cement or mechanical fasteners, and they need not necessarily be made endless. When made endless, one end of the straps 20 and 18 are each passed through passages 22 and 24 (Figure 4) that extend lengthwise through pad 16 and located in a plane passing through the center of the pad. The ends of the straps 20 and 18 are connected and said straps are then pulled through the pad 16 to the position shown in Figure 3 of the drawing. The center plane of the pad 16 is defined with reference to the front and rear surfaces of the pad whereby the straps may be reversed so that said loops thereof lie on either side of the pad. When one side of the pad becomes worn, the other side may be used.

In use, the armband is placed on the upper arm (Figure 1) so that the hooks, flies, etc. may be inserted by penetrating pad 16. To remove the hooks, flies, etc. they are pulled with a crisp jerk thereby separating them from the pad. After considerable service one surface of the pad will become worn, but straps 18 and 20 may be reversed (Figure 3) so that the worn side of the pad is adjacent to the arm of the user and the new side is facing outwardly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A fish lure holder comprising a generally rectangular, resilient, reversible pad of a material of uniform thickness and including flat, duplicate, selectively usable opposite faces adapted to be easily penetrated by hooks of fish lures for removably mounting said lures thereon, said pad having a pair of spaced, parallel, preformed passages extending longitudinally therethrough midway between said faces, and a pair of continuous elastic armbands extending through the passages and providing means for mounting the pad on an arm of a fisherman, said bands being slidably adjustable in the pad and frictionally retained thereby in adjusted position, said pad being reversible on said bands whereby either of said faces may be exposed for use.

References Cited in the file of this patent

UNITED STATES PATENTS

| | | |
|---|---|---|
| 1,969,527 | Schnellbacher | Aug. 7, 1934 |
| 2,058,340 | Miller | Oct. 20, 1936 |
| 2,224,751 | Thillard | Dec. 10, 1940 |
| 2,805,420 | Spellos | Sept. 10, 1957 |